(No Model.)
T. McHUGH.
WATER SUPPLY APPARATUS FOR WATER CLOSETS.
No. 362,897. Patented May 10, 1887.
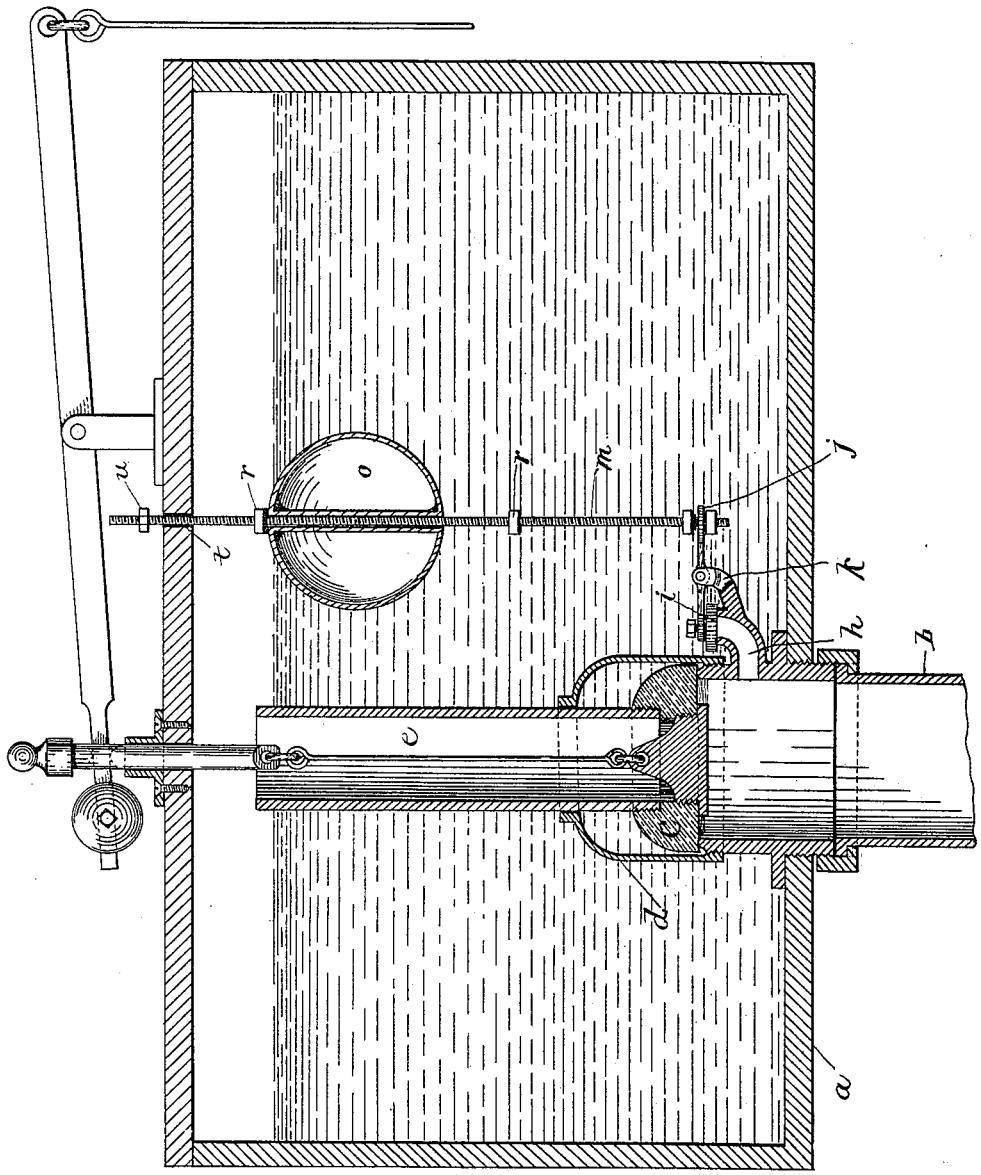
Witnesses:
H. Brown.
A. D. Harrison.
Inventor:
T. McHugh.
by Knight Brown & Quigley
Attys.

UNITED STATES PATENT OFFICE.

TIMOTHY McHUGH, OF BOSTON, MASSACHUSETTS.

WATER-SUPPLY APPARATUS FOR WATER-CLOSETS.

SPECIFICATION forming part of Letters Patent No. 362,897, dated May 10, 1887.

Application filed December 13, 1886. Serial No. 221,435. (No model.)

*To all whom it may concern:*

Be it known that I, TIMOTHY McHUGH, of Boston, in the county of Suffolk and State of Massachusetts, have invented certain new and useful Improvements in Water-Supply Apparatus for Water-Closets, of which the following is a specification.

This invention has for its object to provide means whereby a slow discharge of water from the tank that supplies a water-closet bowl will take place after the cessation of the usual discharge for flushing and cleansing the bowl. The discharge of water caused by the opening of the valve of the supply-tank to flush and cleanse the bowl of the closet after use is usually so rapid and copious that it is liable to cause a siphonic action in the trap of the bowl, and thus remove the water from said trap. The rapidity of the discharge is also such that in some cases it does not leave the proper supply of water standing in the receiver of the bowl.

In the improved apparatus of my invention a final and slow discharge of water takes place after the close of the washing flow, said final discharge being too slow to cause a siphonic action in the trap, while it is sufficient to fill said trap and the receiver of the bowl. I attain this result by the improved devices, which I will now proceed to describe and claim.

The accompanying drawing, forming a part of this specification, represents a vertical section of a water-closet supply apparatus embodying my invention, the bowl and its trap not being shown, as their construction is so well known as to require no illustration.

In the drawing, *a* represents a portion of the supply-tank of a water-closet. *b* represents the discharge-pipe, which conducts water from the tank to the bowl of the closet; and *c* represents the valve which controls the main or washing flow of water from the tank, said valve being normally closed and seated on the upper end of the discharge-pipe and provided with the usual or any suitable means whereby it may be raised or opened by the direct act of a person in the closet. In this case I have shown the valve as working in a cage or open guide, *d*, affixed to the bottom of the tank or to the discharge-pipe, a stand-pipe, *e*, being attached to the valve to serve as an overflow-pipe for the tank when the latter is full. The construction of the tank and its valve and the means for operating the valve form no part of my present invention, and any suitable construction of said parts may be used.

In carrying out my invention I provide near the bottom of the tank a small pipe, *h*, communicating with the discharge-pipe *b*. On the end of said pipe rests a clapper-valve, *i*, attached to a lever, *j*, which is pivoted to a fixed ear or lug, *k*.

*m* represents a vertical rod engaged at its lower end with the rear end of the lever *j*, so that when moved vertically it will tilt said lever, and thus raise or lower the valve *i*, the valve being raised or opened by a downward movement of the rod and lowered or closed by an upward movement of the rod.

*o* represents an air-tight ball or float having a tube extending vertically through it, through which the rod *m* passes. The rod has collars *r r* above and below the float, and by striking one or the other of said collars the float raises or lowers the rod, as hereinafter described, there being room between the collars for an independent vertical movement of the float. The float rises and falls with the water in the tank and operates the valve *i* as follows: When the water in the tank is at its full height, the float is supported thereby at such height that it bears against the upper collar *r* of the rod and holds the rod in its raised position, thus keeping the valve *i* closed. When the water is lowered in the tank by the discharge caused by the opening of the main valve, the float *o* falls and strikes the lower collar *r* on the rod, thus depressing said rod, and causing it to open the valve *i* and allow a small stream of water to escape through the pipe *h*. This flow of water continues after the main valve *c* has closed and until the float *o* is sufficiently raised by the water admitted to the tank by the usual ball-cock. When the float in rising strikes the upper collar *r* of the rod *m*, it raises said rod and closes the valve *i*. The water which thus escapes through the pipe *h* is sufficient to fill the receiver and trap of the closet-bowl, but is not sufficient in force and volume to create a siphonic action in the trap, and is, in fact, so moderate that it leaves the shallow receiver of the bowl well filled.

The upper end of the rod $m$ passes through a guide, $t$, preferably in the top or cover of the tank, and has an adjustable nut or stop, $u$, above said guide, whereby the downward movement of the rod and the extent to which the valve is raised may be limited.

I claim—

The combination of the water-supply tank, the discharge-pipe, the normally-closed main valve for said pipe, devices, substantially as described, whereby said main valve may be directly opened by a person in the closet to cause a flushing discharge of water from the tank, the smaller outlet communicating with the discharge-pipe, a valve, $i$, for said outlet, a float which rises and falls with the water in the tank, and devices, substantially as described, intermediate of said float and valve $i$, whereby said valve is opened when the water is lowered in the tank by the opening of the main valve, and is closed by the rising of the water in the tank after the main valve is released and closed, the opening of the valve $i$ creating a moderate flow sufficient to fill the closet-trap and receiver after the siphonic action of the flushing flow has ceased, as set forth.

In testimony whereof I have signed my name to this specification, in the presence of two subscribing witnesses, this 10th day of December, 1886.

TIMOTHY McHUGH.

Witnesses:
C. F. BROWN,
A. D. HARRISON.